United States Patent [19]

Garrett

[11] Patent Number: 5,193,480
[45] Date of Patent: * Mar. 16, 1993

[54] HOISTING LINE FITTINGS WITH WORKING LOAD LIMIT INDICIA

[75] Inventor: Charles R. Garrett, Ramona, Okla.

[73] Assignee: The Crosby Group, Inc., Tulsa, Okla.

[*] Notice: The portion of the term of this patent subsequent to Apr. 14, 2009 has been disclaimed.

[21] Appl. No.: 762,599

[22] Filed: Sep. 19, 1991

Related U.S. Application Data

[63] Continuation of Ser. No. 643,774, Jan. 22, 1991, Pat. No. 5,103,755.

[51] Int. Cl.⁵ .............................................. G01D 1/00
[52] U.S. Cl. .................................. 116/200; 116/212; 411/400
[58] Field of Search ........... 73/862.39, 862.53, 862.56, 73/761, 762; 116/200, 212, DIG. 34; 411/8, 14, 400, 401

[56] References Cited

U.S. PATENT DOCUMENTS

| 2,966,878 | 1/1961 | Feiser, Jr. | 116/212 |
| 3,033,033 | 5/1962 | Dillon | 73/862.62 |
| 3,034,344 | 5/1962 | Zandman et al. | 73/862.53 |
| 3,077,178 | 2/1963 | Gordon | 116/212 |
| 3,802,379 | 4/1974 | Sandberg | 116/212 |
| 3,853,546 | 12/1974 | Werner et al. | 116/212 X |
| 4,102,295 | 7/1978 | Crook, Jr. et al. | 116/212 X |
| 4,249,474 | 2/1981 | Archer | 116/212 |
| 4,409,841 | 10/1983 | Archer | 116/212 X |

FOREIGN PATENT DOCUMENTS 2073033 9/1971 France .
2647767 12/1990 France .
0243840 12/1925 United Kingdom .

Primary Examiner—William A. Cuchlinski, Jr.
Assistant Examiner—W. Morris Worth
Attorney, Agent, or Firm—Head & Johnson

[57] ABSTRACT

Fittings for use with one or more loading bearing lines or chains comprising an indicia marking on a working portion of the fitting that is representative of an angular load position relative to an in line load position of the lines or chains for that particular fitting.

21 Claims, 3 Drawing Sheets

HOISTING LINE FITTINGS WITH WORKING LOAD LIMIT INDICIA

This is a continuation of copending application Ser. No. 07/643,774 filed on Jan. 22, 1991, now U.S. Pat. No. 5,103,755.

SUMMARY OF THE INVENTION

It is an object of this invention to provide fittings used in conjunction with hoisting lines or chains for lifting loads.

It is a further object of the invention to provide fittings which have indicia markings on a working portion of the fittings to indicate straight load positions and angular load positions of hoisting lines, including wire rope, slings, chains, webbing, synthetic ropes, and other fittings used in connection therewith.

It is a further object of this invention to provide indicia markings on a working portion of a fitting both for straight load position and angular load position of hoisting lines which will provide information relative to working load limits of the fitting and/or hoisting lines used therewith.

Another object of the invention is to provide measurable indicia on hoisting fittings to visibly disclose when a fitting has been overloaded or deformed.

These and other objects of the invention will become readily apparent upon reference to the drawings, the specification, and the claims submitted herewith.

DETAILED DESCRIPTION OF THE INVENTION

Before explaining the present invention in detail, it is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein is for the purpose of description and not of limitation.

Engineers and operators in hoisting loads are knowledgeable of, or have readily accessible information as to the working load limits of fittings, hoisting rope or wire line slings, and chains used to connect the fitting with the load. It is well known that the working load limit of the fitting, the hoisting line, or chain, is a function of the angle of the hoisting line or chain to the fitting. For example, the following table, when referring to FIGS. 10-13, is indicative of typical working load limits (pounds) for alloy sling chains.

| Chain Size | Single Leg Straight Load | | Double Leg - Horizontal Angle | |
|---|---|---|---|---|
| | 90° | 60° | 45° | 30° |
| ¼ | 3,250 | 5,650 | 4,600 | 3,250 |
| | 6,600 | 11,400 | 9,300 | 6,600 |
| | 11,250 | 19,500 | 15,900 | 11,250 |
| | 16,500 | 28,600 | 23,300 | 16,500 |
| | 23,000 | 39,800 | 32,500 | 23,000 |

Thus, from this chart, an operator would know that in the event the sling chain were positioned relative to the fitting at a horizontal angle relative to the load of less than 30°, the working load limits of the chain from that of a straight line load will be reduced. On the other hand, the operator would also know that where the angular position of the sling chain to the load is 60°, the working load limits are increased.

This invention provides indicia means by which an operator will be able to visually determine the angular position of a line or lines to a load which in turn identifies proper working load limits based on the knowledge of the hoisting line, i.e. chain or wire line size.

Figure 1:
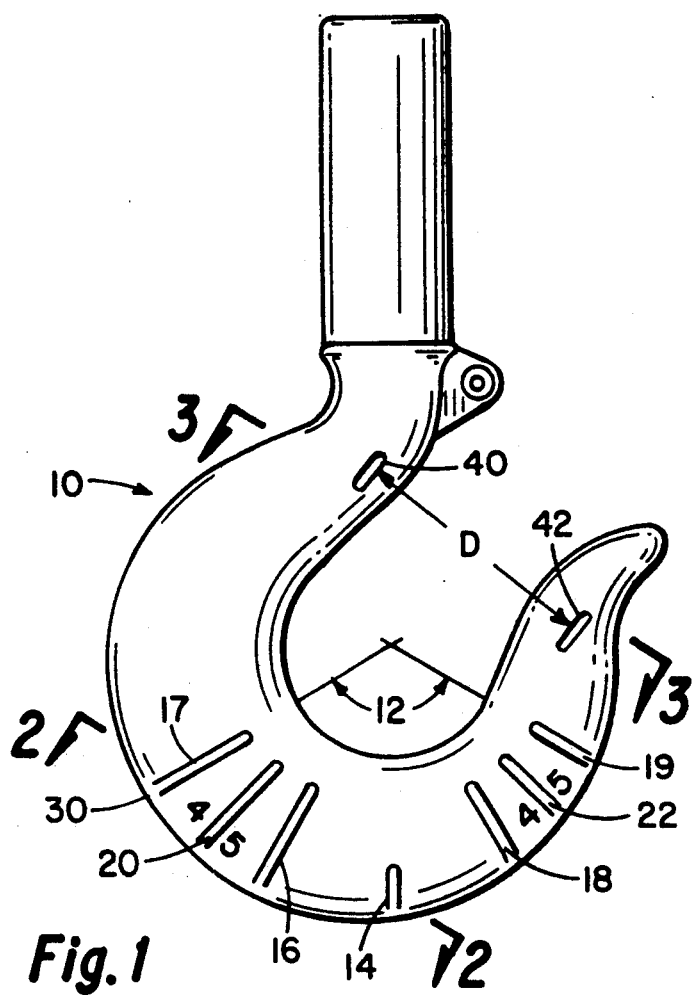
FIG. 1 is a front elevational view of a hook incorporating the indicia markings of this invention.
Figure 2:
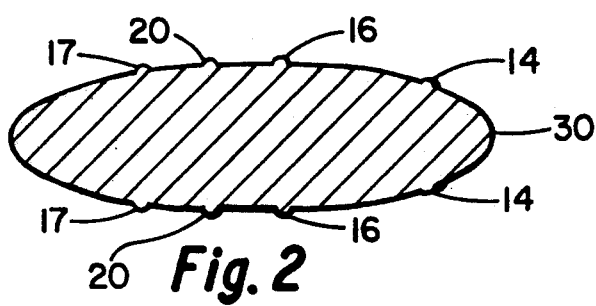
FIG. 2 is a sectional view taken along the line 2—2 of FIG. 1.
Figure 3:
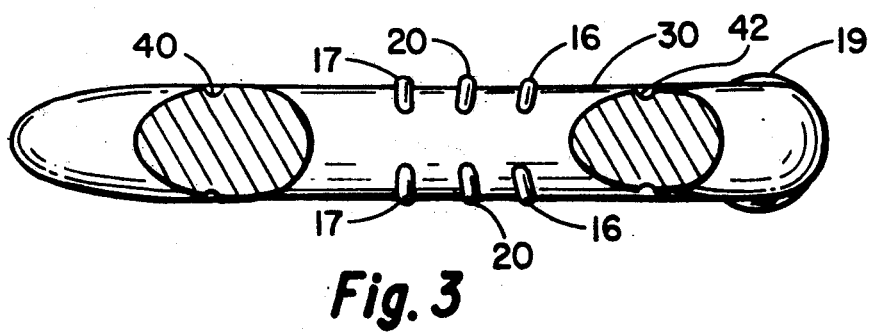
FIG. 3 is a sectional view taken along the line 3—3 of FIG. 1.

Referring now to FIG. 1, a shank hoist hook is generally designated by the numeral 10, it being understood that the invention is capable of use with other types of hooks such as swivel hoist hooks, snap hooks, eye hoist hooks, etc.

Figure 10:
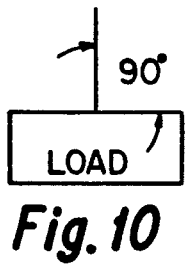
FIG. 10 is a schematic of a single line-straight load sling connection.
Figure 11:
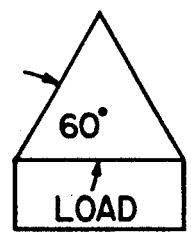
FIGS. 11, 12, and 13 are schematic diagrams of various double leg load sling connections at 60°, 45°, and 30°.

For the purposes of this description, a working portion of the hook generally encompasses the area designated within the throat or bowl of the hook at 12. A protuberance 14 is positioned on each side of the hook such that when a single hoist load is positioned within the working portion of the hook, sometimes called an inline load, such as shown in FIG. 10. Protruding markers 17 and 19 represent a 30° angle to the horizontal load as in FIG. 13. Protruding markers 20 and 22 represent protruding markers at a 45° angle to a straight line or horizontal load (see FIG. 12). These protruding markers are preferably formed on the body 30 of the hook such as by forging, welding, or other means well known to those skilled in the art. It should be understood that the markers described herein could be cavities or indentations.

Another aspect of the invention is the provision of deformation markers 40 and 42 which are provided thereon at a fixed distance D, e.g. at exact inch or half-inch distance, and thus provide means for the operator/engineer/technician to have ready ability to determine whether the hook is still within the range of its original manufactured working load specifications. That is, if the distance D would indicate a measurement greater than or less than the inch or half inch, then the hook has been overloaded, will no longer be within its working load limits, and should be removed from service.

Figure 4:
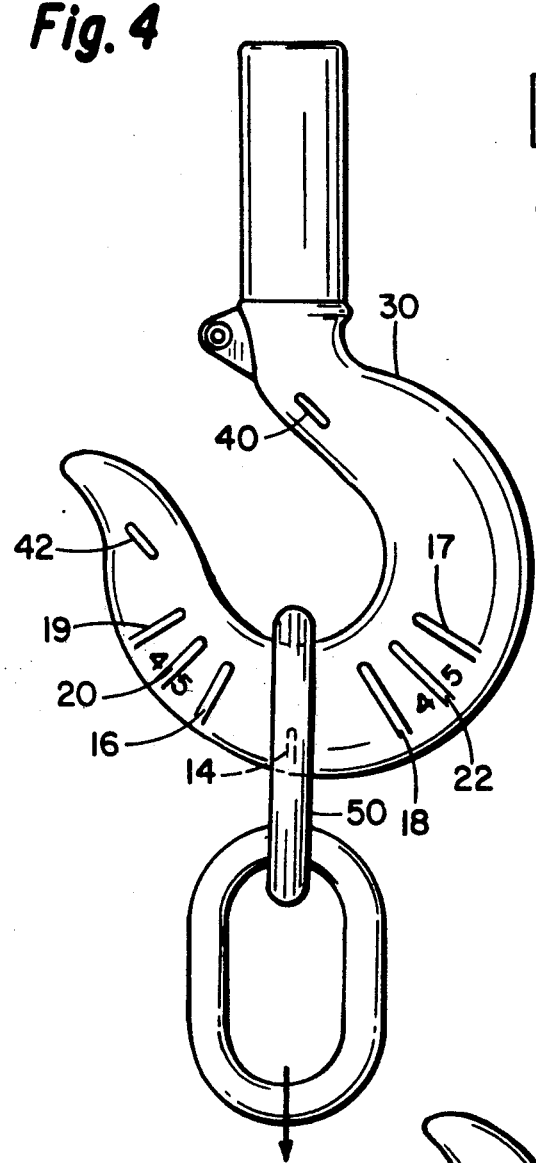
FIG. 4 depicts the use of a hook-type fitting wherein the load is a straight load.
Figure 5:
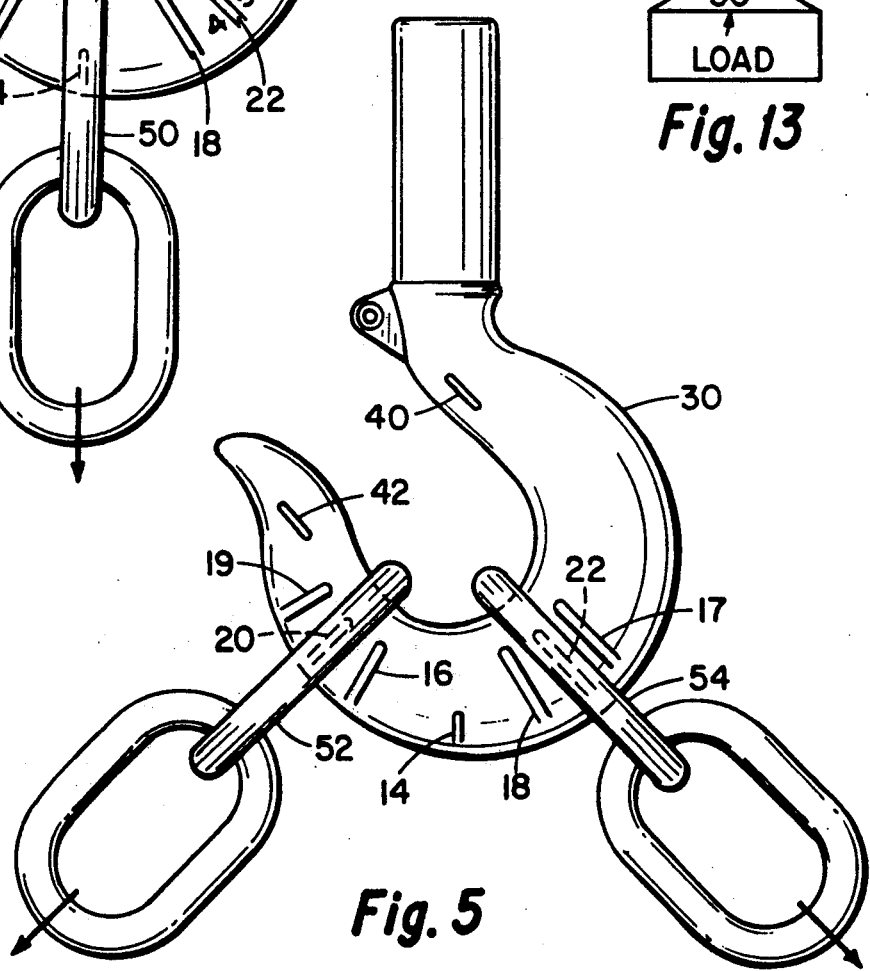
FIG. 5 depicts a hook-type fitting wherein the load is at an angle to the straight line load.

FIGS. 4 and 5 are indicative of the use of the invention, in this instance, with a sling chain. In FIG. 4, a single leg straight load, as per FIG. 10, would have the chain link 50 in alignment with the straight load marker 14. For example, based on the table above, for a ¼" chain size the working load limit in pounds would be 3,250.

Figure 12:
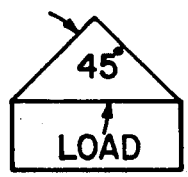
Figure 13:
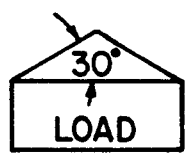

Referring now to FIG. 5 where a pair of sling chains 52 and 54 are used to lift a load, the operator will know since the slings are oriented at a 45° angle to the load as in FIG. 12 and as shown by the markings or indicia 20 and 22 that the working load limits of a quarter inch chain is 4,600 lbs. Similarly, if the sling chains 52 and 54 as they are attached to the load would be oriented so as to be parallel to indicia 16 and 18, the operator would know that the working load limit in that instance would be 5,650 for a ¼" chain size (see FIG. 13).

Figure 6:
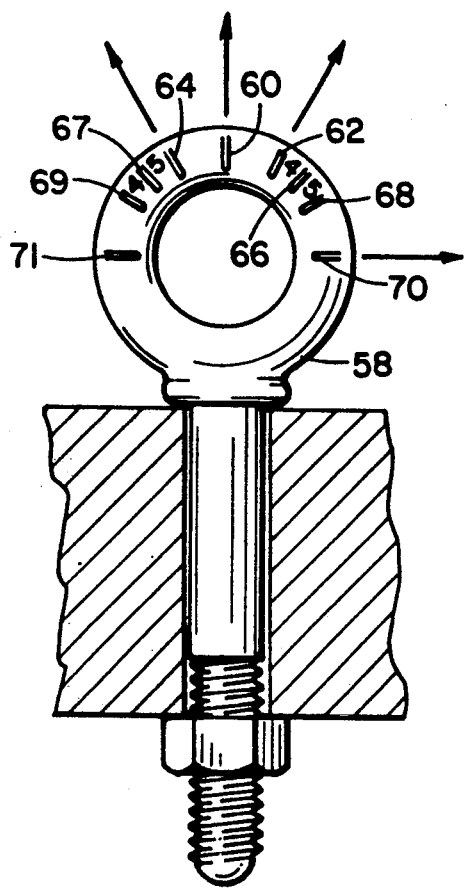
FIG. 6 depicts an eye bolt incorporating the concepts of this invention.
Figure 8:
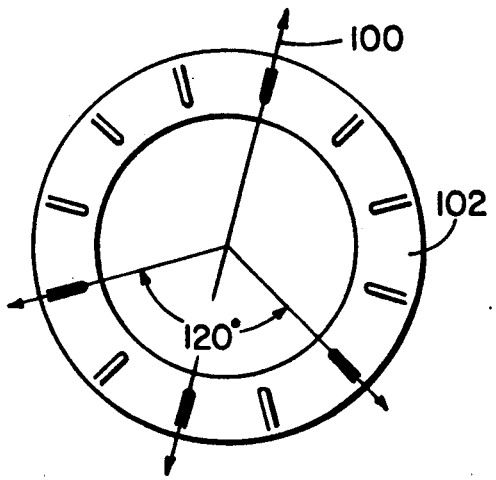
FIG. 8 is a weldless ring incorporating the indicia of this invention.
Figure 7:
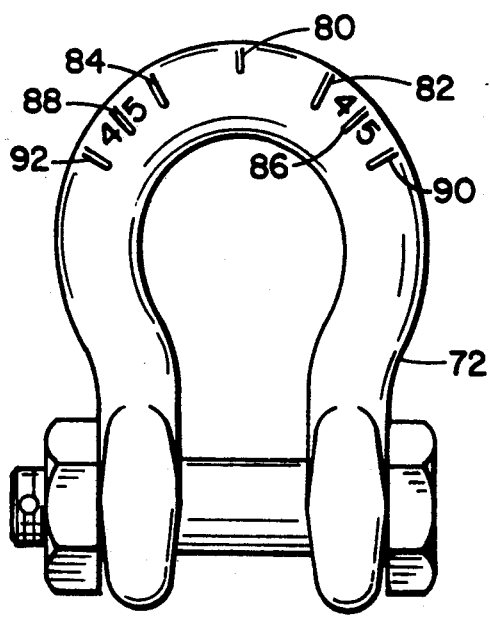
FIG. 7 is a shackle which incorporates the concepts of this invention.
Figure 9:
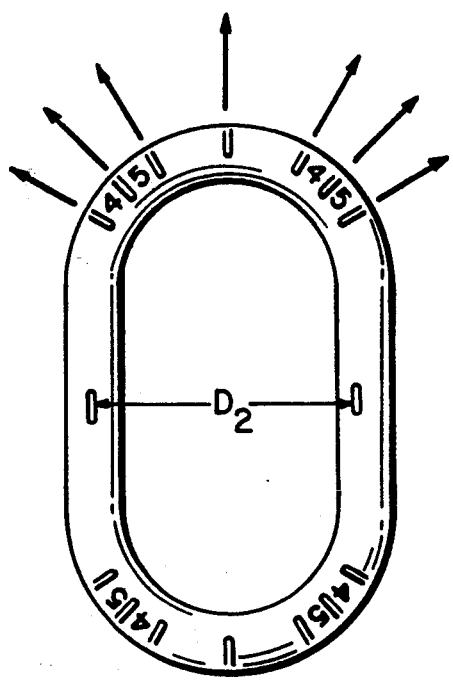
FIG. 9 is a link incorporating the concepts of this invention.

The concept of the invention is similarly applicable to a multitude of hoisting line fittings such as the shoulder bolt of FIG. 6, a shackle of FIG. 7, a weldless ring of FIG. 8, and links such as shown in FIG. 9.

Referring now to FIG. 6, an eye bolt with a straight line pull would coincide with indicia or protuberance 60 and, depending upon the sling used, will provide a given and published working load limit both to the sling or chain and/or to the eye bolt. If, however, the lift chain were oriented to a position 62 or 64, then the working load limits are reduced. For instance, at a 45° direction of pull (numerals 66 and 67) the working load is adjusted to 30% of the rated working load. If a 90° direction of pull (numerals 70 or 71), the working load is adjusted to 25% of the rated working load. In other words, the operator will be advised that the pull load should not exceed 25% of the rated working load.

FIG. 7 describes the same concepts of this invention used with a shackle, that is, a straight line indicia 80, 60° indicia 82 and 84, 45° indicia 86 and 88, and 30° indicia 90 and 92. For example, if the double slings (as shown in FIG. 5) are attached to spaced shackle of FIG. 7 which are attached to a known load (not shown), depending upon the spacing between shackles, the operator should be able to determine from the position of the sling to the markings whether the lift will be safely performed.

The same concepts are carried over into the weldless ring of FIG. 8 and the link as shown in FIG. 9.

Although this invention has been described and shown herein relative to hoisting and lifting of loads, it is within the scope of the invention to include all forms of static and dynamic loads such as found in towing, tie downs, and guying.

What is claimed:

1. A fitting for use with one or more loading bearing line or lines or chain or chains comprising:
    an indicia markings on a working portion of said fitting, said indicia marking identifying at least one angular load position of said line or lines or chain or chains relative to a normally inline load position for said fitting.

2. The apparatus of claim 1 wherein said fitting is a hook.

3. The apparatus of claim 1 wherein said fitting is a weldless ring.

4. The apparatus of claim 1 wherein said fitting is a sling link.

5. The apparatus of claim 1 wherein said fitting is an eye bolt.

6. The apparatus of claim 1 wherein said fitting is a shackle.

7. The apparatus of claim wherein said fitting includes indicia indicative of a fixed spaced dimension.

8. The apparatus of claims 1, 2, 3, 4, 5, 6, or 7 wherein said indicia marking comprises a linear protuberance.

9. The apparatus of claims 1, 2, 3, 4, 5, or 6 wherein there are a plurality of indicia markings at 30, 45, and 60 degrees from said normally inline load position.

10. The apparatus of claims 1, 2, 3, 4, 5, or 6 wherein said angular load position is at 30 degrees.

11. The apparatus of claims 1, 2, 3, 4, 5, or 6 wherein said angular load position is at 45 degrees.

12. The apparatus of claims 1, 2, 3, 4, 5, or 6 wherein said angular load position is at 60 degrees.

13. The apparatus of claims 1, 2, 3, 4, 5, or 6 wherein said indicia marking comprises a linear indentation.

14. A fitting for use with a load bearing line comprising:
    spaced indicia markings, the distance therebetween indicative of a normally fixed spaced dimension required of said fitting when said fitting is within range of an original manufactured working load specification.

15. The apparatus of claim 14 wherein said fitting is a hook.

16. The apparatus of claim 14 wherein said fitting is a weldless ring.

17. The apparatus of claim 14 wherein said fitting is a sling link.

18. The apparatus of claim 14 wherein said fitting is an eye bolt.

19. The apparatus of claim 14 wherein said fitting is a shackle.

20. The apparatus of claims 14, 15, 16, 17, 18, or 19 wherein said indicia markings comprise linear protuberances.

21. The apparatus of claims 14, 15, 16, 17, 18, or 19 wherein said indicia markings comprise linear indentations.

* * * * *